(12) United States Patent
Choi et al.

(10) Patent No.: US 10,088,650 B2
(45) Date of Patent: Oct. 2, 2018

(54) LENS ASSEMBLY AND ELECTRONIC DEVICE WITH THE SAME

(71) Applicant: Samsung Electronics Co., Ltd., Gyeonggi-do (KR)

(72) Inventors: Sung-Wook Choi, Gyeonggi-do (KR); Jin-Seon Seo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 25 days.

(21) Appl. No.: 15/276,934

(22) Filed: Sep. 27, 2016

(65) Prior Publication Data

US 2017/0115469 A1    Apr. 27, 2017

(30) Foreign Application Priority Data

Oct. 21, 2015  (KR) .......................... 10-2015-0146462

(51) Int. Cl.
| | |
|---|---|
| G02B 1/04 | (2006.01) |
| G02B 5/00 | (2006.01) |
| G02B 5/20 | (2006.01) |
| G02B 13/00 | (2006.01) |
| G02B 9/34 | (2006.01) |
| H04N 5/225 | (2006.01) |

(52) U.S. Cl.
CPC .............. *G02B 13/004* (2013.01); *G02B 9/34* (2013.01); *H04N 5/2252* (2013.01); *H04N 5/2254* (2013.01); *G02B 1/041* (2013.01); *G02B 5/005* (2013.01); *G02B 5/208* (2013.01)

(58) Field of Classification Search
CPC ........ G02B 13/004; G02B 9/34; G02B 1/041; G02B 5/005; G02B 5/208; H04N 5/2252; H04N 5/2254

USPC .......................................................... 359/773
See application file for complete search history.

(56) References Cited

U.S. PATENT DOCUMENTS

| | | | |
|---|---|---|---|
| 7,957,079 | B2 | 6/2011 | Tang |
| 8,218,253 | B2 | 7/2012 | Tang |
| 8,294,997 | B2 | 10/2012 | Tang et al. |

(Continued)

FOREIGN PATENT DOCUMENTS

JP      2007-219079 A      8/2007

OTHER PUBLICATIONS

European Search Report, dated Feb. 13, 2017.

*Primary Examiner* — Jie Lei
*Assistant Examiner* — Mitchell Oestreich
(74) *Attorney, Agent, or Firm* — Cha & Reiter, LLC

(57) ABSTRACT

A lens assembly according to one or more embodiments of the present disclosure and an electronic device including the lens assembly may include: a first lens having positive refractive power and disposed along an optical axis and to face an object; a second lens having negative refractive power and disposed along the optical axis and adjacent to the first lens; a third lens having positive refractive power and disposed along the optical axis and adjacent to the second lens; and a fourth lens having a negative refractive power and disposed along the optical axis and adjacent to the third lens, and having a concave face that faces an imaging surface of an image sensor. The characteristics of the lens assembly satisfy a preset requirement equation(s). The lens assembly and the electronic device as described above may be variously implemented according to embodiments.

17 Claims, 15 Drawing Sheets

(56) References Cited

U.S. PATENT DOCUMENTS

| | | |
|---|---|---|
| 8,395,691 B2 | 3/2013 | Tang et al. |
| 8,649,113 B1 | 2/2014 | Tsai et al. |
| 2007/0008625 A1 | 1/2007 | Park et al. |
| 2007/0188891 A1 | 8/2007 | Shinohara |
| 2011/0294542 A1* | 12/2011 | Ray .................. H04B 1/3888 455/556.1 |
| 2012/0044583 A1 | 2/2012 | Ise et al. |
| 2015/0043092 A1 | 2/2015 | Suzuki |
| 2015/0153545 A1* | 6/2015 | Chen .................. H04N 5/2252 348/335 |

* cited by examiner

LENS ASSEMBLY AND ELECTRONIC DEVICE WITH THE SAME

CLAIM OF PRIORITY

This application claims the priority under 35 U.S.C. § 119(a) to Korean Application Serial No. 10-2015-0146462, which was filed in the Korean Intellectual Property Office on Oct. 21, 2015, the entire content of which is hereby incorporated by reference.

TECHNICAL FIELD

The present disclosure relates to an optical device. For example, the present disclosure relate to a lens assembly and an electronic device including the lens assembly.

BACKGROUND

Optical devices (e.g., a camera capable of photographing a still image or a video) have been widely used. Recently, digital cameras or video cameras, which use a solid-state image sensor (e.g., a Charge Coupled Device (CCD) or a Complementary Metal-Oxide Semiconductor (CMOS)), have been widely distributed. Such optical devices that use a solid-state image sensor (a CCD or a CMOS) replace other optical devices that use film due to easy image storage and reproduction as well smaller size.

In order to acquire a high quality image and/or video image, a plurality of lenses may be used for these optical devices. A lens assembly, which is constituted with a combination of lenses, may have, for example, a lower F number and a less aberration, thereby allowing higher quality and/or higher resolution images and/or videos to be acquired. A large number of lenses generally are necessary in order to obtain a lower F number and a less aberration. Such an optical device has generally been configured in the past as a device specialized to photographing, such as a DSLR camera, but recently has also been used in a miniaturized electronic device, such as a mobile communication terminal or smartphone.

SUMMARY

In order to equip an optical device, such as a lens assembly, in a miniaturized electronic device, such as a smart phone, it is necessary to reduce the size of the lens assembly such as the length, width, and/or height of the lens assembly. But doing so may limit the number of lenses included in the lens assembly. When the number of lenses to be equipped in the lens assembly is limited, it may be difficult to acquire a high quality image and/or video image. For example, with a limited number of lenses, it may be difficult to manufacture a lens assembly with a lower F number and a less aberration.

The present disclosure provides a miniaturized lens assembly that is equipped with a small number of lenses (e.g., four (4) lenses), and also provides an electronic device including the lens assembly.

In addition, embodiments disclosed in the present disclosure provides a lens assembly that is excellent in optical characteristics (e.g., an aberration characteristic, a wide angle characteristic, and/or a brightness characteristic) even though the lens assembly is equipped with a small number of lenses (e.g., four (4) lenses), and also provides an electronic device including the lens assembly.

Further, embodiments disclosed in the present disclosure may provide a lens assembly that is excellent in optical characteristics even though the lens assembly is equipped with a small number of lenses (e.g., four (4) lenses), thereby allowing the lens assembly to be easily equipped in a miniaturized electronic device and to acquire a high resolution still image and/or video.

According to one embodiment of the present disclosure, a lens assembly may include a first lens having positive refractive power and disposed along an optical axis and to face an object, a second lens assembly having negative refractive power and disposed along the optical axis and adjacent to the first lens; a third lens assembly having positive refractive power and disposed along the optical axis and adjacent to the second lens, and a fourth lens having negative refractive power and disposed along the optical axis and adjacent to the third lens, and having a concave face that faces the imaging surface of an image sensor.

The characteristics of the lens assembly satisfy Equations 1 and 2 as follows:

$$CT2/OAL < 0.06 \qquad \text{Equation 1}$$

$$EPD/f < 2.0 \qquad \text{Equation 2}$$

Here, "CT2" represents a thickness of the second lens on an optical axis, "OAL" represents a length of the lens assembly, "EPD" represents an Entrance Pupil Diameter of an incident pupil of the lens assembly, and "f" represents a focal distance of the lens assembly.

In addition, according to one embodiment of the present disclosure, an electronic device may include: a lens assembly; and an image sensor that detects an image of an object that passes through the lens assembly.

The lens assembly may include a first lens having positive refractive power and disposed along an optical axis and to face the object, a second lens assembly having negative refractive power and disposed along an optical axis and adjacent to the first lens, a third lens assembly having positive refractive power and disposed along the optical axis and adjacent to the second lens, and a fourth lens having negative refractive power and disposed along the optical axis and adjacent to the third lens, and having a concave face that faces the imaging surface of an image sensor.

The characteristics of the lens assembly satisfy Equations 1 and 2 as follows:

$$CT2/OAL < 0.06 \qquad \text{Equation 1}$$

$$EPD/f < 2.0 \qquad \text{Equation 2}$$

According to embodiments disclosed in the present disclosure, a lens assembly may acquire a bright image with a wide angle and high resolution by adjusting curvature radii of refractive faces of each of the lenses in the lens assembly and forming the refractive faces in aspherical shapes even though the lens assembly is mounted with a small number of lens (e.g., four (4) lenses). In addition, as the lens assembly is mounted with a small number of lenses, the size of the lens assembly (e.g., the entire length of the lens assembly in the direction of the optical axis) is reduced, enabling the lens assembly to be easily mounted in a miniaturized electronic device such as a smart phone.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
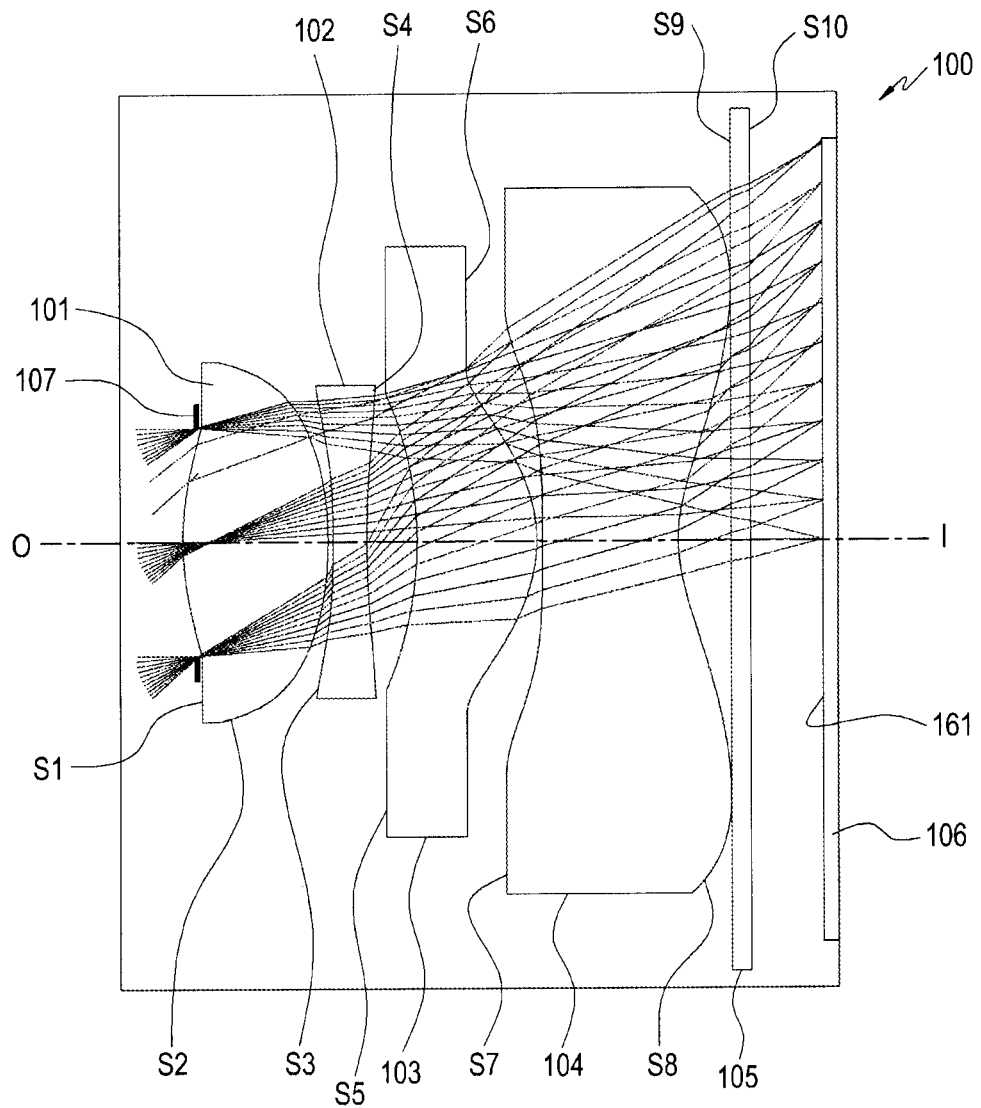
FIG. 1 is a view illustrating a configuration of a lens assembly according to one of various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

In the present disclosure, the terms are used to describe one or more specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings the same as the contextual meanings in the relevant field of art, and are not to be interpreted to have other meanings unless clearly defined in the present specification. In some cases, even the term defined in the present disclosure should not be interpreted to exclude embodiments of the present disclosure.

An electronic device according to one or more embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to one or more embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In one or more embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to one or more embodiments will be described with reference to the accompanying drawings. In the present disclosure, the term "user" may indicate a person using an electronic device or a device (e.g., an artificial intelligence electronic device) using an electronic device. Though some numerical values or the like may be presented in describing one or more embodiments of the present disclosure, it is noted that such numerical values do not limit the present disclosure as long as the numerical values are not defined in the claims.

FIG. 1 is a view illustrating a configuration of a lens assembly 100 according to one of various embodiments of the present disclosure.

Referring to FIG. 1, according to one of various embodiments of the present disclosure, the lens assembly 100 may include a plurality of lenses 101, 102, 103, and 104, and an image sensor 106. According to one embodiment, the image sensor 106 may be configured in an optical device and/or an electronic device, and a lens assembly including a plurality of lenses may be mounted in the optical device and/or the electronic device in conjunction with the image sensor 106.

The plurality of lenses may include first, second, third, and fourth lenses 101, 102, 103, and 104 that are arranged in this order from an object side O to an image side I. Object side O denotes the side adjacent to the image for image capture, while image side I denotes a side adjacent to the position where the image sensor 106 is disposed. The fact that the fourth lens 104 is adjacent to the image sensor 106 may mean that the fourth lens 104 and the image sensor 106 are immediately next to each other while coinciding on an axis, in this example the optical axis O-I. Each of the first to fourth lenses 101, 102, 103, and 104 may be plastic lenses (e.g. the first to fourth lenses 101, 102, 103, and/or 104 are made of plastic), and the first to fourth lenses 101, 102, 103, and 104 may be arranged in an optical axis alignment state with, for example, the image sensor 106 so as to form the optical axis O-I of the lens assembly 100. The first lens 101 may have positive (+) refractive power, the second lens 102 may have negative (−) refractive power, the third lens 103 may have positive refractive power, and the fourth lens 104 may have negative refractive power. According to one embodiments, the fourth lens 104 may be formed such that the face S8 facing the image side I of the fourth lens 104 is concave.

When parallel beams of light are incident on a lens with positive refractive power, the beams may converge while passing through the lens. For example, a lens with positive refractive power may be a convex lens. On the other hand, when parallel beams of light are incident on a lens with negative refractive power, the beams may diverge while passing through the lens. For example, a lens with negative refractive power may be a concave lens.

The entire length of the lens assembly 100 in the direction of the optical axis O-I may be reduced as the interval (e.g., an air gap) between every adjacent lenses in the first to fourth lenses 101, 102, 103, and 104 is reduced. According to one embodiment, the interval between these lenses may be varied during the design of the lens assembly 100 depending on optical characteristics (e.g., an aberration characteristic, a wide angle characteristic, and/or a brightness characteristic) required for the lens assembly 100. According to one embodiment, when the interval between the first and second lenses (101 and 102) is designed and manufactured to be 0.1 mm or less (e.g., 0.05 mm or less), it is possible to acquire a bright image with a high resolution as well as to miniaturize the lens assembly 100.

According to one embodiment, the lens assembly 100 may further include an aperture 107 disposed on one face of the first lens 101, which faces the object side O. When the size of the aperture 107 is adjusted, the quantity of light reaching an imaging surface 161 of the image sensor 106 may be adjusted.

According to one embodiment, the lens assembly 100 may further include an infrared ray-blocking filter 105 between the fourth lens 104 and the image sensor 106. The infrared ray-blocking filter 105 may block light that is invisible to human sight but is detected by a sensor of an optical device (e.g., infrared ray). As a result, for example, the color detected and photographed by the image sensor 106 when the infrared ray-blocking filter 105 is mounted may be similar to the color seen by a human eye when viewing an actual object.

The first lens 101 may be formed such that the face S1 facing the object side O is convex and the face S2 facing the image side I is also convex while the first lens has positive refractive power. The fourth lens 104 may be formed such that the face S7 facing the object side O is convex while the face S8 facing the imaging surface 161 of the image sensor 106 is concave. According to one or more embodiments, each of the faces of the first to fourth lenses 101, 102, 103, and 104 may be formed to be concave or convex, and may be varied in design according to the design of the lens assembly 100. According to one embodiment, as described above, the first lens 101 may have positive refractive power, the second lens 102 may have negative refractive power, the third lens 103 may have positive refractive power, and the fourth lens 104 may have negative refractive power.

Upon satisfying the following Equation 1 and Equation 2, the above-described lens assembly 100 may have an excellent optical characteristic even though the lens assembly 100 is miniaturized.

$$CT2/OAL<0.06 \qquad \text{Equation 1}$$

$$EPD/f<2.0 \qquad \text{Equation 2}$$

Here, "CT2" may represent the thickness of the second lens 102 on the optical axis O-I, "OAL" may represent the entire length of the lens assembly 100 (e.g., the distance from the object side O face S1 of the first lens 101 to the imaging surface 161), "EPD" may represent the Entrance Pupil Diameter of the incident pupil of the lens assembly 100, and "f" may represent the focal distance of the lens assembly 100.

For example, when a ratio of the thickness of the second lens 102 on the optical axis O-I in relation to the length of the lens assembly 100 and a ratio of the size of the Entrance Pupil Diameter of the incident pupil in relation to the focal distance of the lens assembly 100 are designed and manufactured in a predetermined range, it is possible to secure good optical characteristics of the lens assembly 100 (e.g., an aberration characteristic, a wide angle characteristic, and/or a brightness characteristic).

According to one embodiment, a half-field angle of the lens assembly 100 may be in a range that is larger than 38 degrees and smaller than 47 degrees.

According to one embodiment, the lens assembly 100 may also satisfy Equation 3 as follows:

$$-2<f4/f<-0.3 \qquad \text{Equation 3}$$

Here, "f4" may represent the focal distance of the fourth lens 104.

According to one embodiment, the lens assembly 100 may also satisfy Equation 4 as follows:

$$0.5<f3/f<1.5 \qquad \text{Equation 4}$$

Here, "f3" may represent the focal distance of the third lens 103.

A lens assembly (e.g., the above-described lens assembly 100) that satisfies at least one of the requirements of Equations 1 to 4 and/or requirements related to the range of the half-field angle may secure good optical characteristics even though the lens assembly is miniaturized.

Data for various characteristics of the lenses in the lens assembly 100 are represented in Table 1 below, in which "S1 to S10" may indicate the faces of related lenses 101, 102, 103, and 104 and/or the infrared filter 105. The lens assembly 100 may satisfy the above-mentioned requirements (and/or at least one of the above-mentioned requirements) when the F-number is 1.97, the half-field angle is 41.8 degrees, and the focal distance is 2.57 mm.

TABLE 1

| Face | Curvature Radius | Thickness or Air Gap | Refractive Index | Abbe Number |
|---|---|---|---|---|
| S1 | 1.793 | 0.827 | 1.546 | 56 |
| S2 | -2.732 | 0.030 | | |
| S3 | -14.162 | 0.194 | 1.657 | 21.5 |
| S4 | 5.147 | 0.288 | | |
| S5 | -2.118 | 0.688 | 1.546 | 56 |
| S6 | -0.860 | 0.030 | | |
| S7 | 18.474 | 0.781 | 1.546 | 56 |
| S8 | 0.952 | 0.302 | | |
| IR filter | Infinity | 0.110 | 1.517 | 64.2 |
| S9 | Infinity | 0.103 | | |
| S10 | Infinity | 0.291 | | |
| Image | Infinity | 0.005 | | |

Aspherical coefficients of the first to fourth lenses 101, 102, 103, and 104 are represented in Table 2 below in which the aspherical coefficients may be calculated through Equation 5 as follows.

$$z = \frac{cY^2}{1+\sqrt{1-(1+K)c^2Y^2}} + AY^4 + BY^4 + CY^4 + DY^4 + EY^4 + FY^4 + \ldots \qquad \text{Equation 5}$$

Here, "z" may represent a distance from the apex of a lens in the optical axis direction, "c" may represent a basic curvature of a lens, "Y" may represent a distance in a direction perpendicular to an optical axis, "K" may represent a Conic constant, and "A," "B," "C," "D," "E," and "F" may represent aspherical coefficients, respectively.

TABLE 2

| | S1 | S2 | S3 | S4 | S6 | S7 | S8 |
|---|---|---|---|---|---|---|---|
| K | -1.241437 | -34.19914 | 0 | 0 | -0.38694 | 0 | -4.03642 |
| A | -0.0708 | -0.832147 | -0.59584 | -0.06795 | 0.197976 | -0.31936 | -0.18593 |
| B | 0.2923396 | 2.0562007 | 1.415584 | -0.0181 | 0.068843 | 0.261427 | 0.141491 |
| C | -1.355208 | -3.153353 | -1.19011 | 0.486253 | 0.062115 | -0.09334 | -0.07015 |
| D | 2.1308783 | 2.3005533 | -0.81757 | -0.92607 | -0.03863 | -0.04501 | 0.020746 |

TABLE 2-continued

|   | S1 | S2 | S3 | S4 | S6 | S7 | S8 |
|---|---|---|---|---|---|---|---|
| E | −0.97625 | −0.717556 | 2.155488 | −0.02212 | 0.12927 | 0.05994 | −0.00339 |
| F | −1.016503 | −0.011001 | −1.07354 | 1.167567 |  | −0.01562 | 0.000228 |
| G | −0.025356 | −0.038484 | 0.01975 | −0.66331 |  |  |  |

Figure 2:
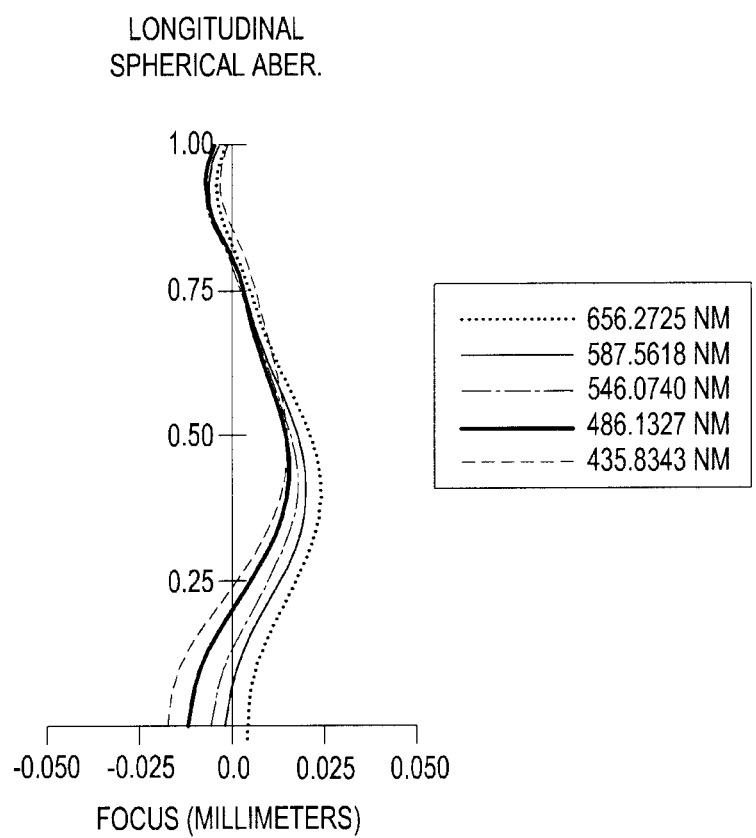
FIG. 2 is a graph illustrating spherical aberration of the lens assembly according to one of various embodiments of the present disclosure.

FIG. 2 is a graph illustrating a spherical aberration of a lens assembly 100 according to one of various embodiments of the present disclosure.

In FIG. 2, the horizontal axis represents a longitudinal spherical aberration coefficient, and the vertical axis represents a normalized distance from the center of an optical axis. A change in a longitudinal spherical aberration according to a wavelength of light is illustrated in FIG. 2.

Figure 3:
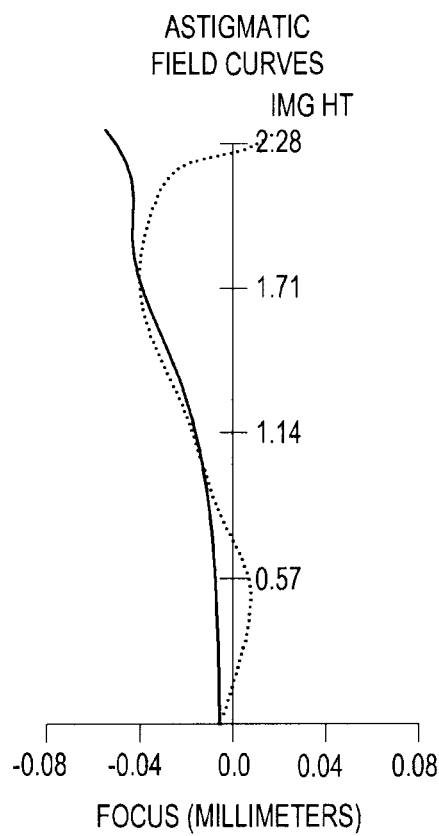
FIG. 3 is a graph illustrating an astigmatism of the lens assembly according to one of various embodiments of the present disclosure.

FIG. 3 is a graph illustrating an astigmatism of a lens assembly 100 according to one of various embodiments of the present disclosure.

In FIG. 3, the astigmatism of the lens assembly 100 is obtained at a wavelength of 546.074 nm. In FIG. 3, the solid line represents an astigmatism in a tangential direction, and the dot line represents an astigmatism in a sagittal direction.

Figure 4:
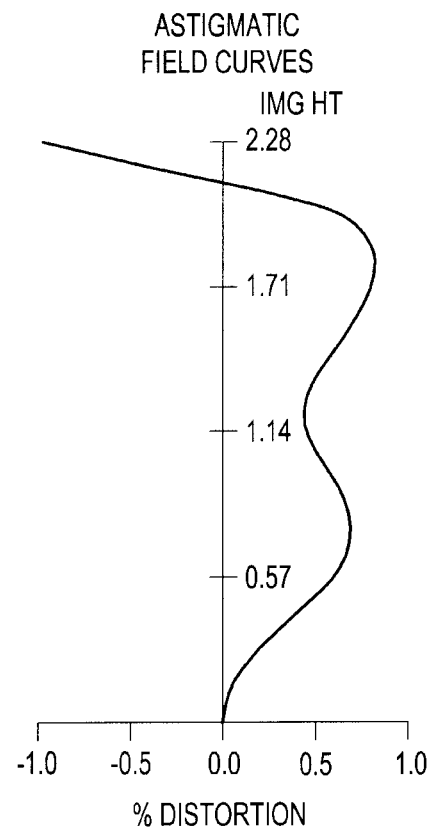
FIG. 4 is a graph illustrating a distortion rate of the lens assembly according to one of various embodiments of the present disclosure.

FIG. 4 is a graph illustrating a distortion rate of a lens assembly 100 according to one of various embodiments of the present disclosure.

Referring to FIG. 4, an image photographed through the lens assembly 100 may be somewhat distorted at a location that deviates from the optical axis O-I. However, such a distortion is in a range of generally occurring distortions of optical devices that uses lenses, such as less than 1%. A distortion rate less than 1% generally represents good optical characteristic.

Figure 5:
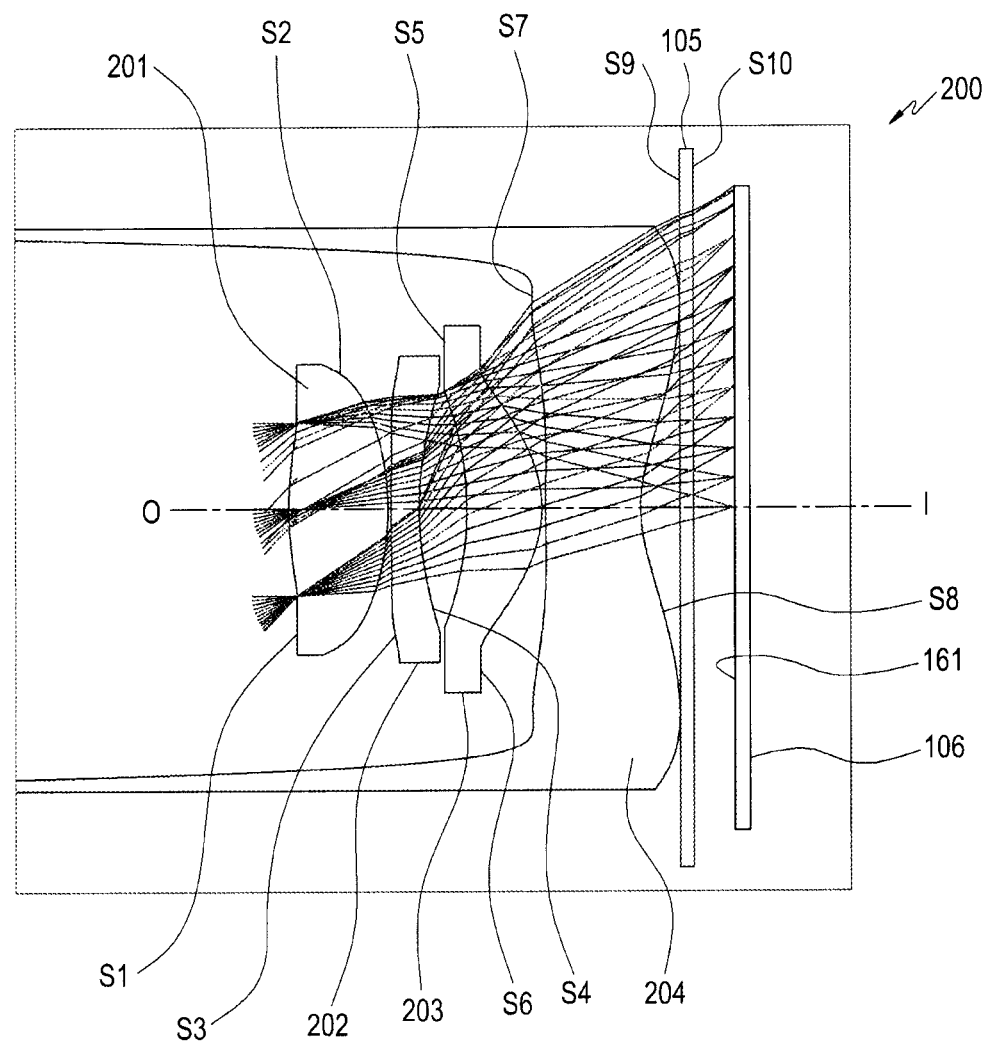
FIG. 5 is a view illustrating a configuration of a lens assembly according to another one of various embodiments of the present disclosure.
Figure 6:
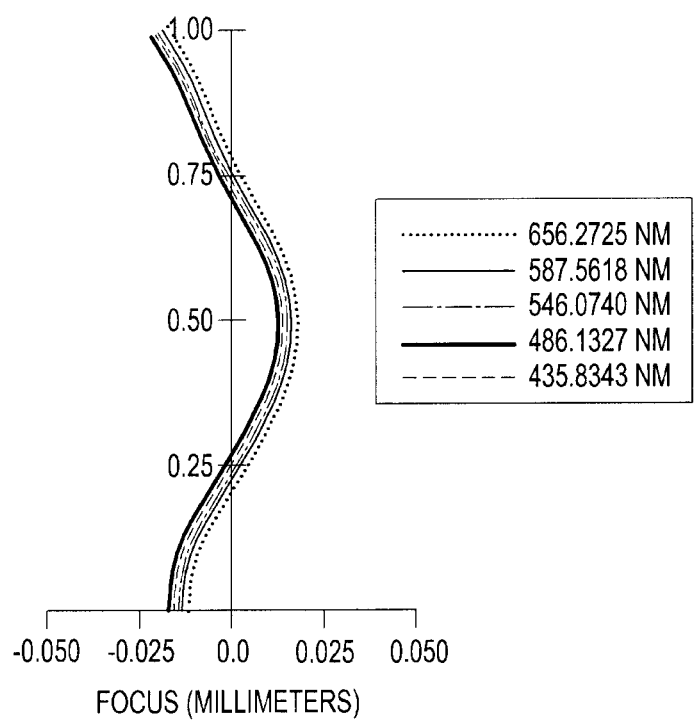
FIG. 6 is a graph illustrating spherical aberration of the lens assembly according to another one of various embodiments of the present disclosure.
Figure 7:
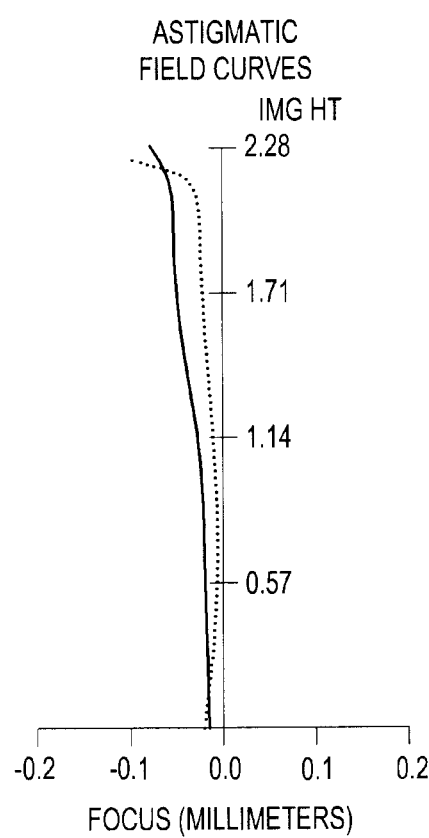
FIG. 7 is a graph illustrating an astigmatism of the lens assembly according to another one of various embodiments of the present disclosure.
Figure 8:
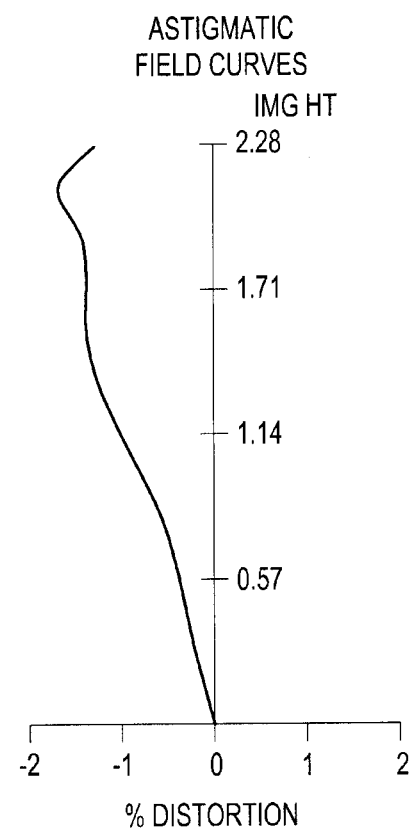
FIG. 8 is a graph illustrating a distortion rate of the lens assembly according to another one of various embodiments of the present disclosure.

FIG. 5 is a view illustrating a configuration of a lens assembly 200 according to another one of various embodiments of the present disclosure. FIG. 6 is a graph illustrating a spherical aberration of the lens assembly 200 according to another one of various embodiments of the present disclosure. FIG. 7 is a graph illustrating an astigmatism of the lens assembly 200 according to another one of various embodiments of the present disclosure. FIG. 8 is a graph illustrating a distortion rate of the lens assembly 200 according to another one of various embodiments of the present disclosure.

In describing one or more embodiments of the present disclosure below, the components described therein that can be easily understood through the configuration of the preceding embodiment may be denoted by the same reference numerals or the reference numerals may be omitted, and the detailed descriptions thereof may also be omitted.

Referring to FIGS. 5 to 8, according to another one of various embodiments of the present disclosure, the lens assembly 200 may include a plurality of lenses 201, 202, 203, and 204, and an image sensor 106. The plurality of lenses may include first, second, third, and fourth lenses 201, 202, 203, and 204 that are arranged in this order from an object side O to an image side I. Each of the first to fourth lenses 201, 202, 203, and 204 may be plastic lenses (e.g. the first to fourth lenses 201, 202, 203, and/or 204 are made of plastic), and the first to fourth lenses 201, 202, 203, and 204 may be arranged in an optical axis alignment state with, for example, the image sensor 106 so as to form the optical axis O-I of the lens assembly 200. The first lens 201 may have positive refractive power, the second lens 202 may have negative refractive power, the third lens 203 may have positive refractive power, and the fourth lens 204 may have negative refractive power. According to one embodiment, the fourth lens 204 may be formed such that the face S8 facing the image side I of the fourth lens 204 is concave.

According to one embodiment, the lens assembly 200 may further include an infrared ray-blocking filter 105 between the fourth lens 204 and the image sensor 106. The infrared ray-blocking filter 105 may block light that is invisible to human sight but is detected by a sensor of an optical device. As a result, for example, the color detected and photographed by the image sensor 106 when the infrared ray-blocking filter 105 is mounted may be similar to the color seen by a human eye when viewing an actual object.

The first lens 201 may be formed such that the face S1 facing the object side O is convex and the face S2 facing the image side I is also convex while the first lens 201 has positive refractive power. The fourth lens 204 may be formed such that the face S7 facing the object side O is convex while the face S8 facing the imaging surface 161 of the image sensor 106 is concave. According to one or more embodiments, each of the faces of the first to fourth lenses 201, 202, 203, and 204 may be formed to be concave or convex, and may be varied in design according to the design of the lens assembly 200.

The lens assembly 200 may satisfy at least one of the above-mentioned requirements (e.g., the requirements represented by Equations 1 to 4 and/or a range of half-field angle).

Data for various characteristics of the lenses in the lens assembly 200 are represented in Table 3 below, and aspherical coefficients of the first to fourth lenses 201, 202, 203, and 204 are represented in Table 4 below. The lens assembly 200 may satisfy the above-mentioned requirements (and/or at least one of the above-mentioned requirements) when the F-number is 1.95. the half-field angle is 42.5 degrees, and the focal distance is 2.39 mm.

TABLE 3

| Face | Curvature Radius | Thickness or Air Gap | Refractive Index | Abbe Number |
|---|---|---|---|---|
| S1 | 2.205 | 0.792 | 1.546 | 56 |
| S2 | −1.752 | 0.025 |  |  |
| S3 | 8.178 | 0.210 | 1.657 | 21.5 |
| S4 | 1.834 | 0.383 |  |  |
| S5 | −2.024 | 0.604 | 1.546 | 56 |
| S6 | −0.742 | 0.030 |  |  |
| S7 | 12.910 | 0.758 | 1.546 | 56 |
| S8 | 0.871 | 0.314 |  |  |
| IR filter | Infinity | 0.110 | 1.517 | 64.2 |
| S9 | Infinity | 0.134 |  |  |
| S10 | Infinity | 0.184 |  |  |
| Image | Infinity | 0.015 |  |  |

TABLE 4

|   | S1 | S2 | S3 | S4 | S6 | S7 | S8 |
|---|---|---|---|---|---|---|---|
| K | −1.758571 | −16.16163 | 0 | 0.525437 | −1.184 | 0 | −5.42599 |
| A | −0.097754 | −0.378901 | −0.20163 | −0.18497 | 0.217587 | −0.15254 | −0.10217 |
| B | 0.1459517 | 0.3518351 | 0.077358 | 0.162401 | −0.46122 | 0.049107 | 0.057088 |
| C | −0.68861 | −0.03886 | 0.573207 | −0.13348 | 0.542324 | 0.040281 | −0.02477 |
| D | 0.6179831 | −0.18293 | −0.63944 | 0.125373 | −0.21536 | −0.03235 | 0.006505 |
| E | −0.097847 | −0.069231 | 0.192688 | −0.07326 | −0.09832 | 0.002052 | −0.00086 |
| F | −0.026657 | 0.0221562 | −0.0071 | 0.034692 | 0.154002 | 0.004452 | 3.19E−05 |
| G | −0.000509 | −0.001781 | 0.000187 | −0.04778 | 0.018019 | −0.00108 | −1.11E−05 |
| H | 1.54E−10 | 5.37E−10 | 7.48E−10 | 0.000855 | −0.02559 |  | 2.72E−06 |

Figure 9:
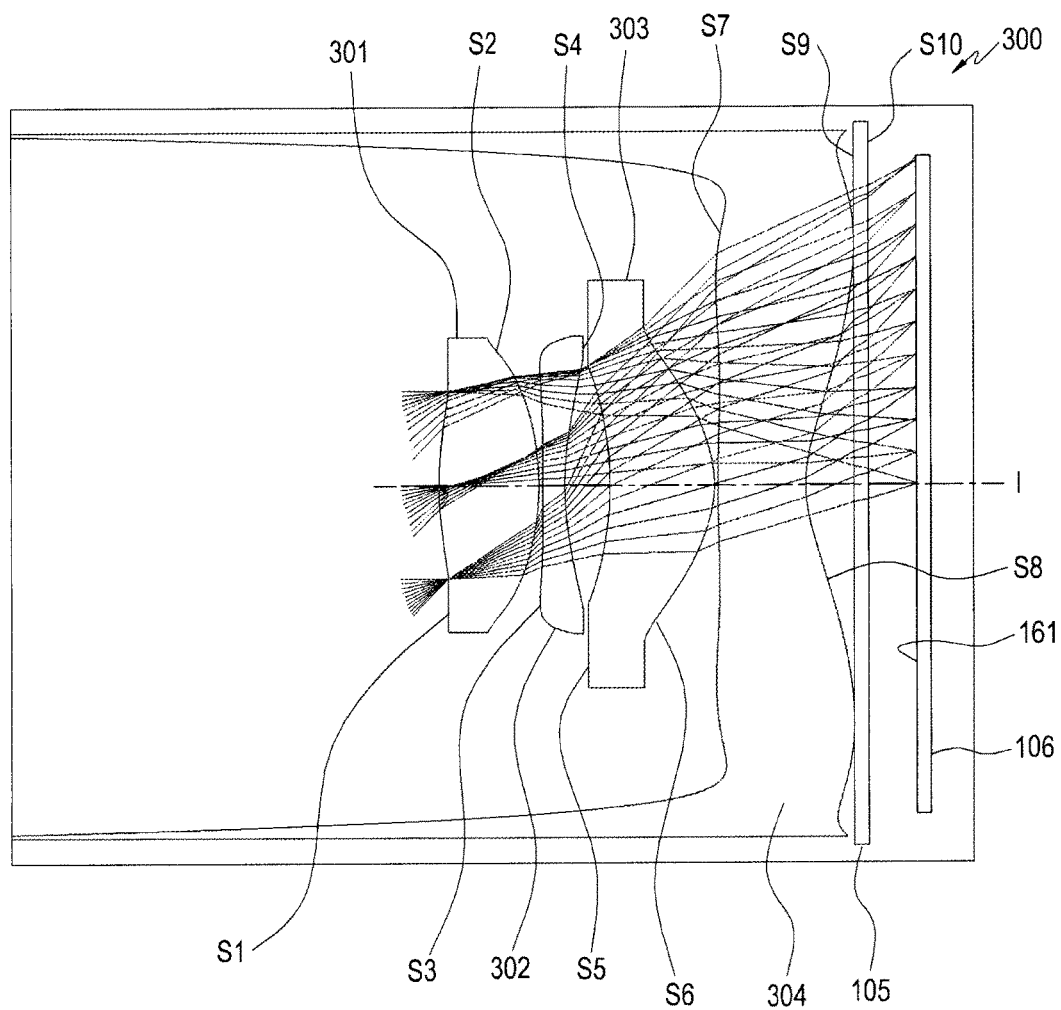
FIG. 9 is a view illustrating a configuration of a lens assembly according to still another one of various embodiments of the present disclosure.
Figure 10:
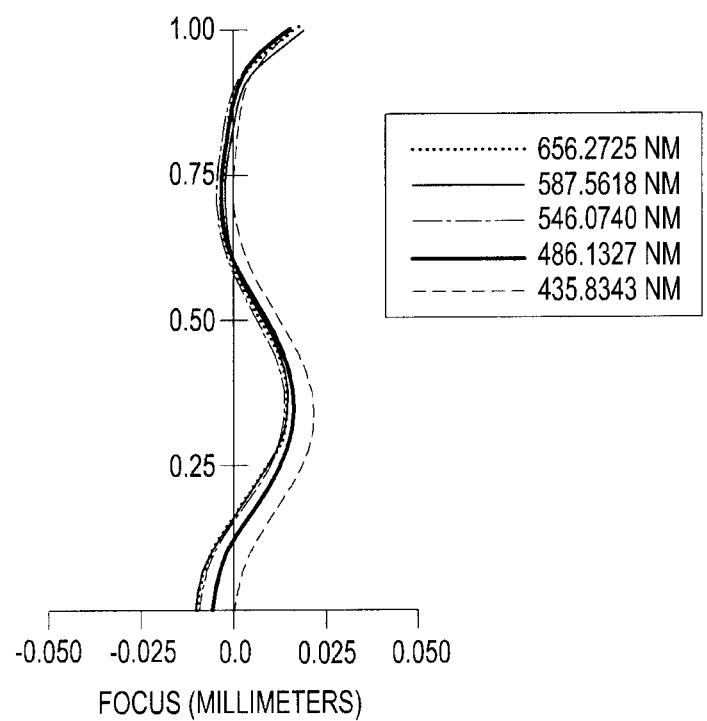
FIG. 10 is a graph illustrating spherical aberration of the lens assembly according to still another one of various embodiments of the present disclosure.
Figure 11:
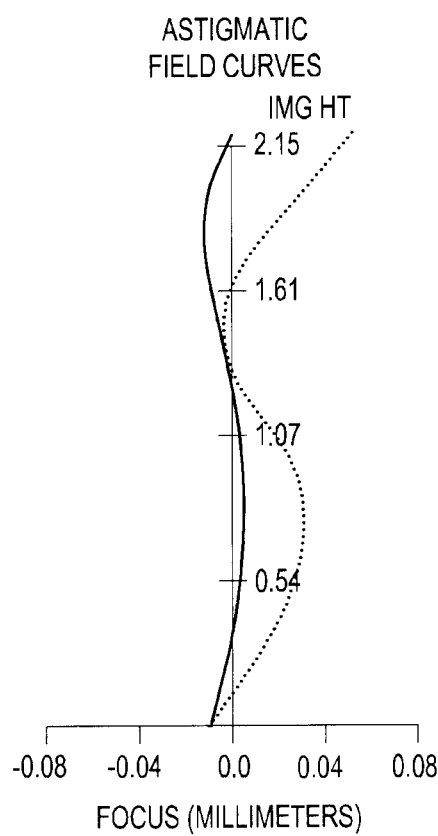
FIG. 11 is a graph illustrating an astigmatism of the lens assembly according to still another one of various embodiments of the present disclosure.
Figure 12:
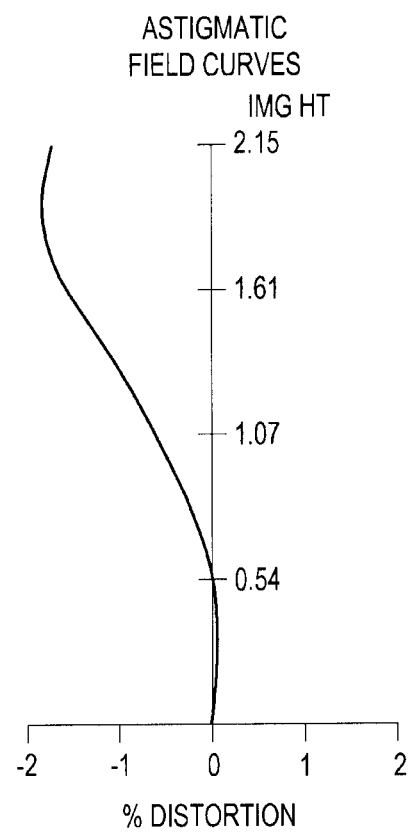
FIG. 12 is a graph illustrating a distortion rate of the lens assembly according to still another one of various embodiments of the present disclosure.

FIG. 9 is a view illustrating a configuration of a lens assembly 300 according to still another one of various embodiments of the present disclosure. FIG. 10 is a graph illustrating a spherical aberration of the lens assembly 300 according to still another one of various embodiments of the present disclosure. FIG. 11 is a graph illustrating an astigmatism of the lens assembly 300 according to still another one of various embodiments of the present disclosure. FIG. 12 is a graph illustrating a distortion rate of the lens assembly 300 according to still another one of various embodiments of the present disclosure.

Referring to FIGS. 9 to 12, according to still another one of various embodiments of the present disclosure, the lens assembly 300 may include a plurality of lenses 301, 302, 303, and 304, and an image sensor 106. The plurality of lenses may include first, second, third, and fourth lenses 301, 302, 303, and 304 that are arranged in this order from an object side O to an image side I. Each of the first to fourth lenses 301, 302, 303, and 304 may be plastic lenses (e.g. the first to fourth lenses 301, 302, 303, and/or 304 are made of plastic), and the first to fourth lenses 301, 302, 303, and 304 may be arranged in an optical axis alignment state with, for example, the image sensor 106 so as to form the optical axis O-I of the lens assembly 300. The first lens 301 may have positive refractive power, the second lens 302 may have negative refractive power, the third lens 303 may have positive refractive power, and the fourth lens 304 may have negative refractive power. According to one embodiments, the fourth lens 304 may be formed such that the face S8 facing the image side I of the fourth lens 304 is concave.

According to one embodiment, the lens assembly 300 may further include an infrared ray-blocking filter 105 between the fourth lens 304 and the image sensor 106.

The first lens 301 may be formed such that the face S1 facing the object side O is convex and the face S2 facing the image side I is also convex while the first lens 301 has positive refractive power. The fourth lens 304 may be formed such that the face S7 facing the object side O is convex while the face S8 facing the imaging surface 161 of the image sensor 106 is concave. According to one or more embodiments, each of the faces of the first to fourth lenses 301, 302, 303, and 304 may be formed to be concave or convex, and may be varied in design according to the design of the lens assembly 300.

The lens assembly 300 may satisfy at least one of the above-mentioned requirements (e.g., the requirements represented by Equations 1 to 4 and/or the range of half-field angle).

Data for various characteristics of the lenses in the lens assembly 300 are represented in Table 5 below, and aspherical coefficients of the first to fourth lenses 301, 302, 303, and 304 are represented in Table 6 below. The lens assembly 300 may satisfy the above-mentioned requirements (and/or at least one of the above-mentioned requirements) when the F-number is 1.95, the half-field angle is 41.9 degrees, and the focal distance is 2.43 mm.

TABLE 5

| Face | Curvature Radius | Thickness or Air Gap | Refractive Index | Abbe Number |
|---|---|---|---|---|
| S1 | 2.162 | 0.781 | 1.546 | 56 |
| S2 | −1.400 | 0.027 |  |  |
| S3 | 22.477 | 0.170 | 1.657 | 21.5 |
| S4 | 1.654 | 0.352 |  |  |
| S5 | −1.929 | 0.804 | 1.546 | 56 |
| S6 | −0.690 | 0.027 |  |  |
| S7 | 7.847 | 0.680 | 1.546 | 56 |
| S8 | 0.761 | 0.374 |  |  |
| IR filter | Infinity | 0.110 | 1.517 | 64.2 |
| S9 | Infinity | 0.193 |  |  |
| S10 | Infinity | 0.137 |  |  |
| Image | Infinity | 0.010 |  |  |

TABLE 6

|   | S1 | S2 | S3 | S4 | S6 | S7 | S8 |
|---|---|---|---|---|---|---|---|
| K | −9.251435 | −20.80128 | 0 | −15.3171 | −3.19094 | 0 | −5.29344 |
| A | 0.0183852 | −0.472799 | −0.05589 | 0.075105 | −0.28237 | −0.07862 | −0.08237 |
| B | 0.1246168 | 0.3534291 | −0.71746 | −0.1318 | 0.270244 | −0.02236 | 0.0437 |
| C | −1.795285 | 0.3696351 | 1.614248 | −0.1212 | −0.15813 | 0.062748 | −0.01992 |
| D | 4.3322435 | −1.365597 | 0.260405 | 0.639145 | −0.0734 | −0.03279 | 0.00582 |
| E | −4.179645 | 0.8099527 | −3.47818 | −0.49807 | 0.227265 | 0.007578 | −0.00095 |
| F | −0.036792 | 0.0626418 | 2.671947 |  | −0.08031 | −0.00068 | 6.47E−05 |

Figure 13:
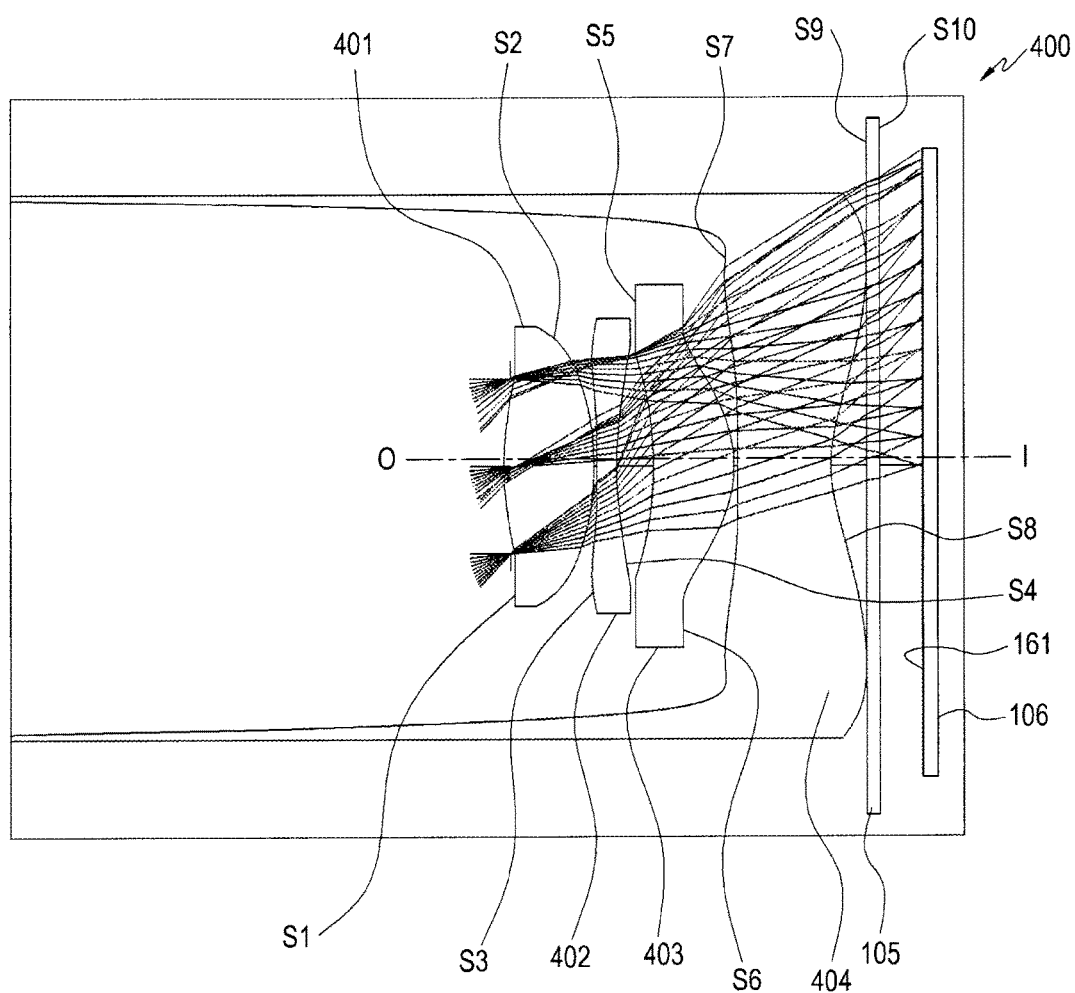
FIG. 13 is a view illustrating a configuration of a lens assembly according to yet another one of various embodiments of the present disclosure.
Figure 14:
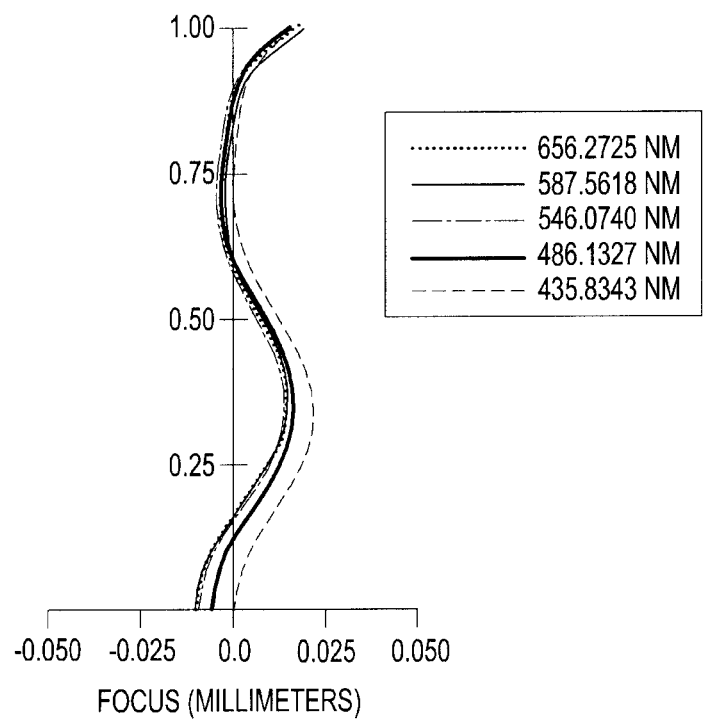
FIG. 14 is a graph illustrating a spherical aberration of the lens assembly according to yet another one of various embodiments of the present disclosure.
Figure 15:
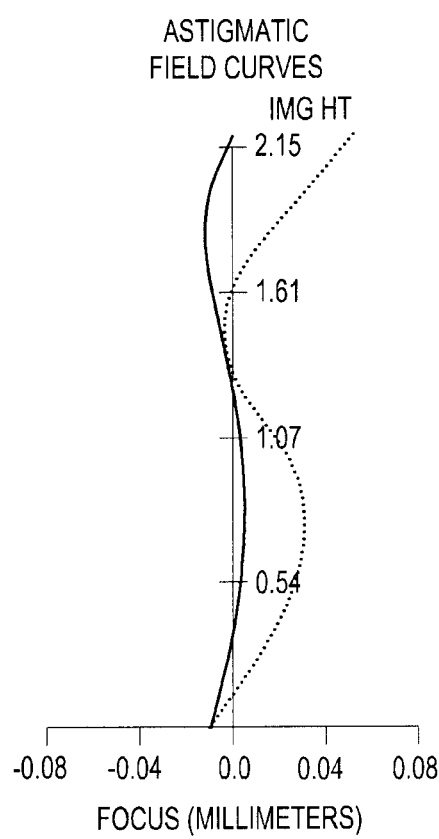
FIG. 15 is a graph illustrating an astigmatism of the lens assembly according to yet another one of various embodiments of the present disclosure.
Figure 16:
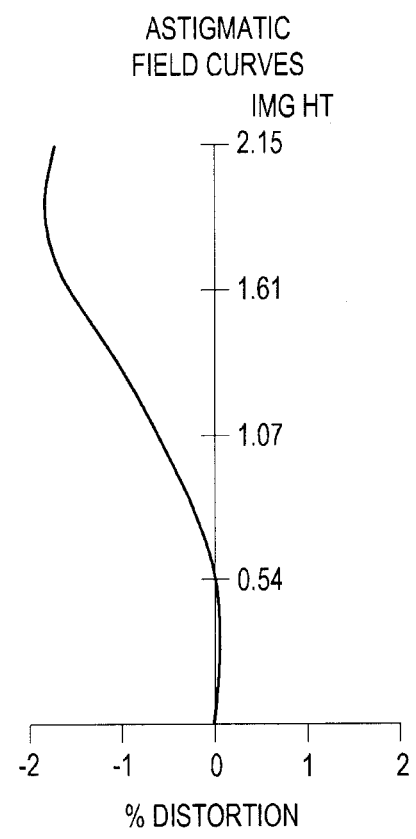
FIG. 16 is a graph illustrating a distortion rate of the lens assembly according to another one of various embodiments of the present disclosure.

FIG. 13 is a view illustrating a configuration of a lens assembly 400 according to yet another one of various embodiments of the present disclosure. FIG. 14 is a graph illustrating a spherical aberration of the lens assembly 400 according to yet another one of various embodiments of the present disclosure. FIG. 15 is a graph illustrating an astigmatism of the lens assembly 400 according to yet another one of various embodiments of the present disclosure. FIG. 16 is a graph illustrating a distortion rate of the lens assembly 400 according to yet another one of various embodiments of the present disclosure.

Referring to FIGS. 13 to 16, according to another one of various embodiments of the present disclosure, the lens assembly 400 may include a plurality of lenses 401, 402, 403, and 404, and an image sensor 106. The plurality of lenses may include first, second, third, and fourth lenses 401, 402, 403, and 404 that are arranged in this order from an object side O to an image side I. Each of the first to fourth lenses 401, 402, 403, and 404 may be plastic lenses (e.g. the first to fourth lenses 401, 402, 403, and/or 404 are made of plastic), and the first to fourth lenses 401, 402, 403, and 404 may be arranged in an optical axis alignment state with, for example, the image sensor 106 so as to form the optical axis O-I of the lens assembly 400. The first lens 401 may have positive refractive power, the second lens 402 may have negative refractive power, the third lens 403 may have positive refractive power, and the fourth lens 404 may have negative refractive power. According to one embodiment, the fourth lens 404 may be formed such that the face S8 facing the image side I of the fourth lens 404 is concave.

According to one embodiment, the lens assembly 400 may further include an infrared ray-blocking filter 105 between the fourth lens 404 and the image sensor 106.

The first lens 401 may be formed such that the face S1 facing the object side O is convex and the face S2 facing the image side I is also convex while the first lens 401 has positive refractive power. The fourth lens 404 may be formed such that the face S7 facing the object side O is convex while the face S8 facing the imaging surface 161 of the image sensor 106 is concave. According to one or more embodiments, each of the faces of the first to fourth lenses 401, 402, 403, and 404 may be formed to be concave or convex, and may be varied in design according to the design of the lens assembly 400. According to one embodiment, as described above, the first lens 401 may have positive refractive power, the second lens 402 may have negative refractive power, the third lens 403 may have positive refractive power, and the fourth lens 404 may have negative refractive power.

The lens assembly 400 may satisfy at least one of the above-mentioned requirements (e.g., the requirements represented by Equations 1 to 4 and/or the range of half-field angle).

Data for various characteristics of the lenses in the lens assembly 400 are represented in Table 7 below, and aspherical coefficients of the first to fourth lenses 401, 402, 403, and 404 are represented in Table 8 below. The lens assembly 400 may satisfy the above-mentioned requirements (and/or at least one of the above-mentioned requirements) when the F-number is 1.90, the half-field angle is 42.0 degrees, and the focal distance is 2.43 mm.

TABLE 7

| Face | Curvature Radius | Thickness or Air Gap | Refractive Index | Abbe Number |
|---|---|---|---|---|
| S1 | 1.833 | 0.775 | 1.546 | 56 |
| S2 | −1.847 | 0.025 | | |
| S3 | −50.571 | 0.170 | 1.657 | 21.5 |
| S4 | 2.225 | 0.312 | | |
| S5 | −−2.263 | 0.690 | 1.546 | 56 |
| S6 | −0.773 | 0.030 | | |
| S7 | 35.919 | 0.799 | 1.546 | 56 |
| S8 | 0.920 | 0.305 | | |
| IR filter | Infinity | 0.110 | 1.517 | 64.2 |
| S9 | Infinity | 0.134 | | |
| S10 | Infinity | 0.185 | | |
| Image | Infinity | 0.014 | | |

TABLE 8

| | S1 | S2 | S3 | S4 | S6 | S7 | S8 |
|---|---|---|---|---|---|---|---|
| K | −0.95855 | −19.89156 | 0 | −0.76934 | −1.0763 | 0 | −5.29027 |
| A | −0.096389 | −0.453995 | −0.32668 | −0.2287 | 0.218658 | −0.15883 | −0.11008 |
| B | 0.2952787 | 0.6103524 | 0.284101 | 0.30387 | −0.33821 | 0.058997 | 0.063712 |
| C | −1.107427 | −0.468661 | 0.435412 | −0.34054 | 0.362443 | 0.051616 | −0.02696 |
| D | 0.9784483 | 0.058646 | −0.57828 | 0.279221 | −0.04927 | −0.03972 | 0.006343 |
| E | −0.09796 | −0.068074 | 0.183483 | −0.08834 | −0.0389 | 0.00111 | −0.0006 |
| F | −0.034355 | 0.0244808 | −0.00658 | 0.03407 | 0.038984 | 0.005562 | 1.73E−05 |
| G | −0.000509 | 0.0015957 | 0.001377 | −0.04864 | 0.03784 | −0.00123 | −2.41E−05 |
| H | 2.39E−11 | 4.07E−10 | 7.09E−10 | 4.01E−10 | −0.03793 | | 4.51E−06 |

Data of the lens assemblies 100, 200, 300, and 400 described above with reference to the embodiments and/or the lenses of each of the lens assemblies 100, 200, 300, and 400 are represented in Table 9 below. The data may satisfy the above-mentioned requirements (e.g., Equations 1 to 4 and/or the range of half-field angle).

TABLE 9

| | f | f1 | f2 | f3 | f4 | Half-Field Angle | OAL | FNO | f3/f | f4/f | CT2 | CT2/OAL |
|---|---|---|---|---|---|---|---|---|---|---|---|---|
| Embodiment 1 | 2.57 | 2.11 | −5.66 | 2.21 | −1.86 | 41.8 | 3.65 | 1.97 | 0.86 | −0.72 | 0.194 | 0.053 |
| Embodiment 2 | 2.39 | 1.92 | −3.64 | 1.84 | −1.75 | 42.5 | 3.57 | 1.95 | 0.77 | −0.73 | 0.210 | 0.059 |
| Embodiment 3 | 2.43 | 1.68 | −2.70 | 1.60 | −1.60 | 41.9 | 3.67 | 1.95 | 0.66 | −0.66 | 0.170 | 0.046 |
| Embodiment 4 | 2.42 | 1.81 | −3.21 | 1.84 | −1.74 | 42.0 | 3.55 | 1.90 | 0.76 | −0.72 | 0.170 | 0.048 |

In Table 9 above, "Embodiment 1" may refer to the lens assembly 100 illustrated in FIG. 1, "Embodiment 2" may refer to the lens assembly 200 illustrated in FIG. 5, "Embodiment 3" may refer to the lens assembly 300 illustrated in FIG. 9, and "Embodiment 4" may refer to the lens assembly 400 illustrated in FIG. 13.

In addition, in Table 9 above, "f" may represent the focal distance of the lens assembly, "f1" may represent the focal distance of the first lens, "f2" may represent the focal distance of the second lens, "f3" may represent the focal distance of the third lens, and "f4" may represent the focal distance of the fourth lens. "OAL" may represent the entire length of each of the lens assemblies (e.g., a distance from the object side (O) face (e.g., the face indicated by "S1") to the imaging surface 161), and "CT2" may represent the thickness of the second lens on the optical axis O-I.

As described above, according to one or more embodiment of the present disclosure, a lens assembly 100, 200, 300, or 400 is equipped with small number of lenses (e.g., four (4) lenses) to be easily miniaturized, and by adjusting the curvature radius of a refractive face of each lens and forming the refractive face as an aspherical face, it may be easy to acquire a high quality images or video, such as bright images with high resolution.

Figure 17:
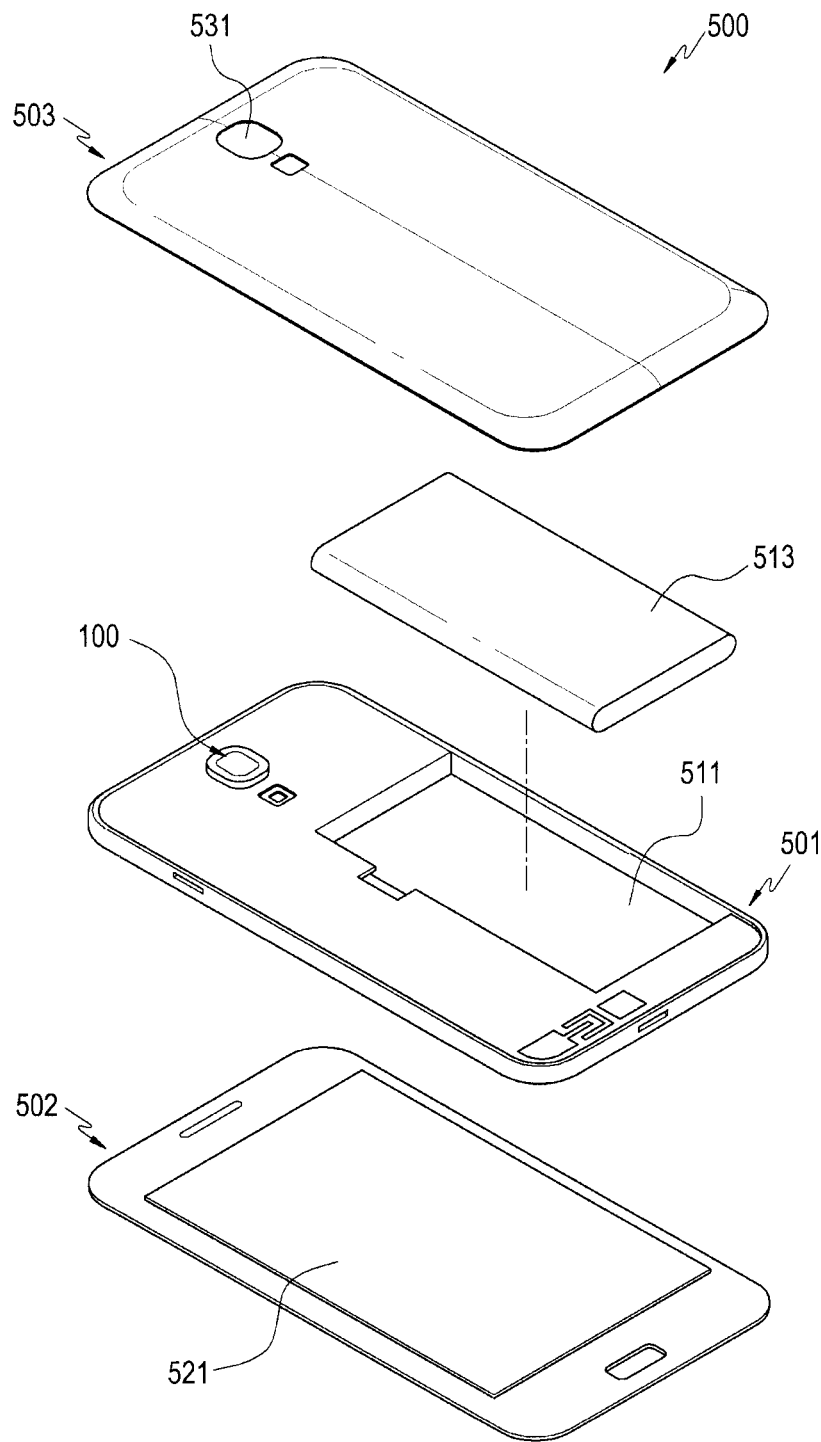
FIG. 17 is an perspective view illustrating an electronic device including a lens assembly according to one of various embodiments of the present disclosure.

FIG. 17 is an perspective view illustrating an electronic device 500 that includes a lens assembly 100 according to one of various embodiments of the present disclosure.

Referring to FIG. 17, the electronic device 500, which includes the lens assembly 100 according to one of various embodiments of the present disclosure, may include a housing 501, a front cover 502 mounted on the front face of the housing 501, and a cover member (e.g., a rear cover 503) detachably mounted on the rear face of the housing 501. A circuit board mounted with various electronic components may be embedded in the housing 501, and any one and/or a plurality of the above-mentioned lens assemblies may be mounted on the rear face of the housing 501.

In the case where the rear cover 503 is detachably provided on the housing 501, a photographing opening 531 may be formed in the rear cover 503 so as to provide a photographing path of the lens assembly 100. According to one embodiment, the housing 501 may be formed with a recess 511 to mount the battery 513, and the battery 513 may be detachably mounted in the recess 511 when the rear cover 503 is removed. In addition, the battery 513 may be integrated within the housing 501 so that the battery 513 is not detachable.

The front cover 502 may include a display 521 mounted on the inner face thereof, and the display 521 may output a screen in a direction opposite to the photographing direction of the lens assembly 100. Although not illustrated, the electronic device 500 may include an additional lens assembly that is capable of photographing in the same direction as the screen outputting direction of the display 521.

As described above, according to one embodiment of the present disclosure, a lens assembly may include a first lens having positive refractive power and disposed along an optical axis and to face an object, a second lens assembly having negative refractive power and disposed along the optical axis and adjacent to the first lens, a third lens assembly having positive refractive power and disposed along the optical axis and adjacent to the second lens, and a fourth lens having negative refractive power and disposed along the optical axis and adjacent to the third lens, and having a first concave face that faces the imaging surface of an image sensor.

The characteristics of the lens assembly satisfy Equations 1 and 2 as follows:

$$CT2/OAL < 0.06 \qquad \text{Equation 1}$$

$$EPD/f < 2.0 \qquad \text{Equation 2}$$

Here, "CT2" represents a thickness of the second lens on an optical axis, "OAL" represents a length of the lens assembly, "EPD" represents an Entrance Pupil Diameter of an incident pupil of the lens assembly, and "f" represents a focal distance of the lens assembly.

According to one embodiment, the characteristics of the lens assembly may satisfy Equation 3 as follows:

$$38.0° < \text{half-field angle} < 47.0°, \qquad \text{Equation 3}$$

wherein "half-field angle" is a half-field angle of the lens assembly

According to one embodiment, a face of the first lens facing the object may be convex.

According to one embodiment, an air gap between the first lens and the second lens may be 0.1 mm or less.

According to one embodiment, the first lens, the second lens, the third lens, and/or the fourth lens is made of plastic.

According to one embodiment, the characteristics of the lens assembly may satisfy Equation 4 as follows:

$$-2 < f4/f < -0.3 \qquad \text{Equation 4}$$

Here, "f4" represents a focal distance of the fourth lens, and "f" represents the focal distance of the lens assembly.

According to one embodiment, the characteristics of the lens assembly may satisfy Equation 5 as follows:

$$0.5 < f3/f < 1.5 \qquad \text{Equation 5}$$

Here, "f3" represents a focal distance of the third lens, and "f" represents the focal distance of the lens assembly.

According to one embodiment, a second face of the fourth lens facing the object may be convex.

According to one embodiment of the present disclosure, an electronic device may include a lens assembly; and an image sensor that detects an image of an object that passes through the lens assembly.

The lens assembly may include a first lens having positive refractive power and disposed along an optical axis and to face the object, a second lens having negative refractive power and disposed along the optical axis and adjacent to the first lens, a third lens having positive refractive power and disposed along the optical axis and adjacent to the second lens, and a fourth lens having negative refractive power and disposed along the optical axis and adjacent to the third lens, and having a first concave face that faces the imaging surface of the image sensor.

The characteristics of the lens assembly satisfy Equations 1 and 2 as follows:

$$CT2/OAL < 0.06 \qquad \text{Equation 1}$$

$$EPD/f < 2.0 \qquad \text{Equation 2}$$

Here, "CT2" represents a thickness of the second lens on an optical axis, "OAL" represents a length of the lens assembly, "EPD" represents an Entrance Pupil Diameter of an incident pupil of the lens assembly, and "f" represents a focal distance of the lens assembly.

According to one embodiment, the electronic device may further include: a housing mounted with the lens assembly on one face of the electronic device, the housing includes a detachable cover member on the one face of the electronic device; and an opening formed in the detachable cover member to provide a photographing path of the lens assembly.

According to one embodiment, the characteristics of the lens assembly of the electronic device may satisfy Equation 3 as follows:

$$38.0° < \text{half-field angle} < 47.0° \qquad \text{Equation 3}$$

where "half-field angle" is a half-field angle of the lens assembly.

According to one embodiment, the face of the first lens facing the object may be convex.

According to one embodiment, an air gap between the first lens and the second lens may be 0.1 mm or less.

According to one embodiment, the first lens, the second lens, the third lens, and/or the fourth lens may be made of plastic.

According to one embodiment, the characteristics of the lens assembly of the electronic device may satisfy Equation 4 as follows:

$$-2 < f4/f < -0.3 \qquad \text{Equation 4}$$

Here, "f4" represents a focal distance of the fourth lens, and "f" represents the focal distance of the lens assembly.

According to one embodiment, the characteristics of the lens assembly of the electronic device may satisfy Equation 5 as follows:

$$0.5 < f3/f < 1.5 \qquad \text{Equation 5}$$

Here, "f3" represents a focal distance of the third lens, and "f" represents the focal distance of the lens assembly.

According to one embodiment, the face of the fourth lens facing the object may be convex.

Figure 18:
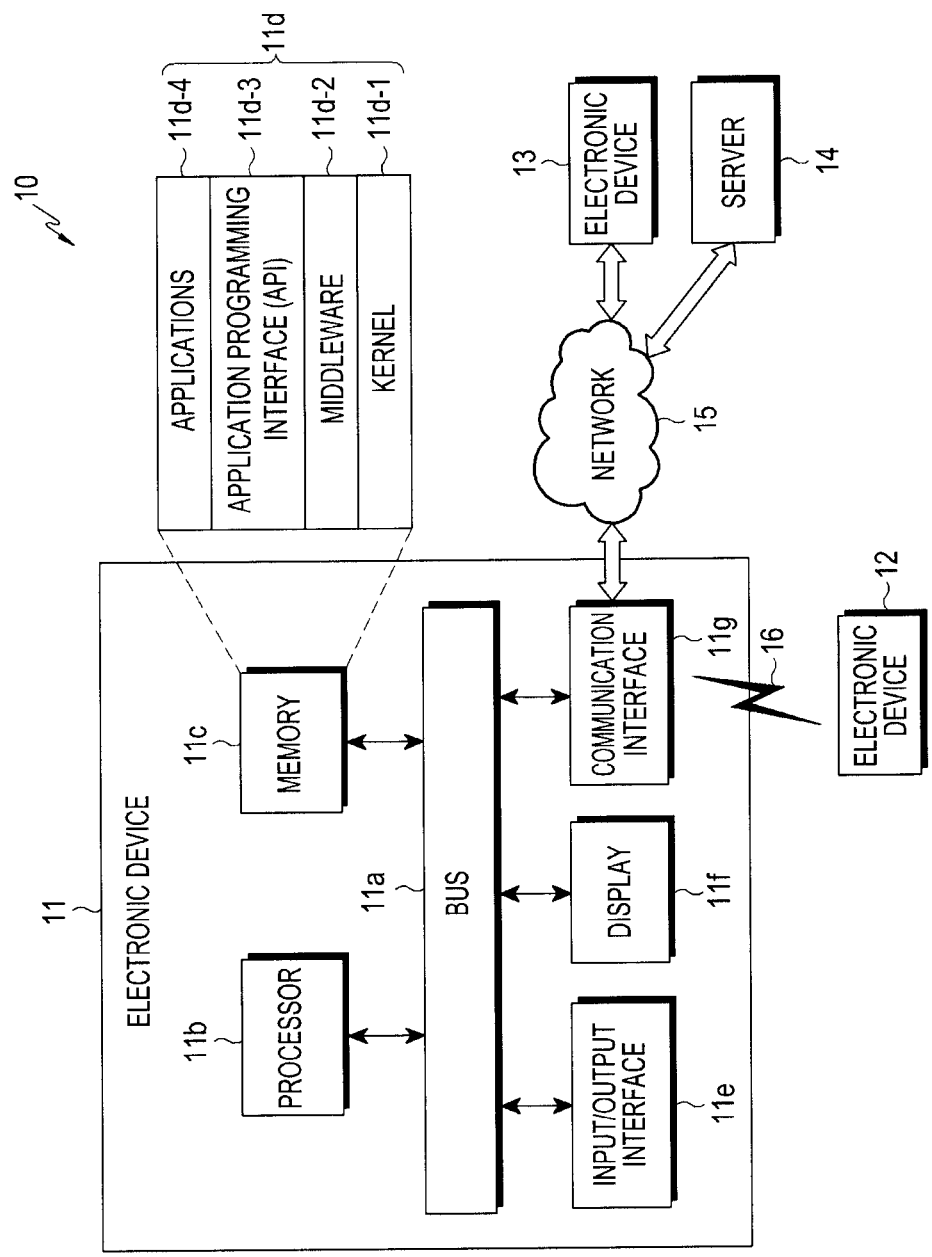
FIG. 18 is a diagram illustrating a network environment that includes an electronic device including a lens assembly according to various embodiments of the present disclosure.

FIG. 18 is a diagram illustrating a network environment 10 that includes an electronic device 11 according to various embodiments of the present disclosure.

Descriptions will be made on an electronic device 11 within the network environment 10 in various embodiments with reference to FIG. 18. The electronic device 11 may include a portion and/or the whole of the electronic device 500 described above, and may include a bus 11a, a processor 11b, a memory 11c, an input/output interface 11e, a display 11f, and a communication interface 11g. In a certain embodiment, the electronic device 11 may omit at least one of the above-mentioned components or may additionally include other components.

The bus 11a may include, for example, a circuit that connects the above-mentioned components 11a to 11g and transmits communication (e.g., a control message and/or data) between the components.

The processor 11b may include one or more of a Central Processing Unit (CPU), an Application Processor (AP), and a Communication Processor (CP). The processor 11b may execute, for example, an arithmetic operation or data processing that is related to a control and/or communication of one or more other components of the electronic device 11.

The memory 11c may include a volatile memory and/or a non-volatile memory. The memory 11c may store, for example, commands or data that are related to one or more other components of the electronic device 11. According to one embodiment, the memory 11c may store software and/or a program 11d. The program 11d may include, for example, a kernel 11d-1, a middleware 11d-2, an Application Programming Interface (API) 11d-3, and/or an application program (or an "application") 11d-4. At least one of the kernel 11d-1, the middleware 11d-2, and the API 11d-3 may be referred to as an Operating System (OS).

The kernel 11d-1 may control or manage, for example, system resources (e.g., the bus 11a, the processor 11b, the memory 11c, and/or other hardware and software resources) that are used for executing operations or functions implemented in the other programs (e.g., the middleware 11d-2, the API 11d-3, or the application programs 11d-4). In addition, the kernel 11d-1 may provide an interface that allows the middleware 11d-2, the API 11d-3, or the application program 11d-4 to access individual components of the electronic device 11 so as to control or manage the system resources.

The middleware 11d-2 may play an intermediary role such that, for example, the API 11d-3 or the application programs 11d-4 may communicate with the kernel 11d-1 so as to exchange data.

In addition, the middleware 11d-2 may process one or more task requests according to priority. For example, the middleware 11d-2 may assign the priority to be capable of using a system resource of the electronic device 11 (e.g., the bus 11a, the processor 11b, or the memory 11c) to at least one application program 11d-4. For example, the middleware 11d-2 may perform scheduling, load balancing, or the like for the one or more task requests by processing the one or more requests according to the assigned priority.

The API 11d-3 is, for example, an interface that allows the application 11d-4 to control functions provided from the kernel 11d-1 or the middleware 11d-2, and may include, for example, one or more interfaces or functions (e.g., commands) for a file control, a window control, an image processing, or a character control.

The input/output interface 11e may serve as an interface to transmit commands or data, which are entered from, for example, a user or any other external device, to the other component(s) of the electronic device 11. Also, the input/output interface 11e may output commands or data, which are received from the other component(s) of the electronic device 11, to the user or the other external device.

The display 11f may include, for example, a Liquid Crystal Display (LCD), a Light Emitting Diode (LED) display, an Organic Light Emitting Diode (OLED) display, or a MicroElectroMechanical systems (MEMS) display, or an electronic paper display. The display 11f may display various contents (e.g., text, image, video, icon, or symbol) to, for example, the user. The display 11f may include a touch screen, and may receive a touch input, a gesture input, a proximity input, or a hovering input that is made using, for example, an electronic pen or a part of the user's body using capacitive, resistive, or another type of technology.

The communication interface 11g may set, for example, communication between the electronic device 11 and an external device (e.g., a first external electronic device 12, a second external device 13, or a server 14). For example, the communication interface 11g may communicate with the external device (e.g., the second external electronic device 13 or the server 14) by being connected with a network 15 through wired or wireless communication.

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short range communication 16. The short range communication 16 may include at least one of, for example, Wireless Fidelity (WiFi), Bluetooth, Near Field Communication (NFC), and Global Navigation Satellite System (GNSS). GNSS may include, for example, at least one of Global Positioning System (GPS), Global Navigation Satellite System (Glonass), Beidou Navigation Satellite System (hereinafter, "Beidou"), Galileo, and the European global satellite-based navigation system. Herein, "GPS" may be interchangeably used with "GNSS" below. The wired communication may use at least one of, for example, Universal Serial Bus (USB), High Definition Multimedia Interface (HDMI), Recommended Standard 232 (RS-232), and Plain Old Telephone Service (POTS). The network 15 may include a telecommunication network, for example, at least one of a computer network (e.g., LAN or WAN), the internet, and a telephone network.

Each of the first and second external electronic devices 12 and 13 may be a type of device that is the same as, or different from, the electronic device 11. According to one embodiment, the server 14 may include a group of one or more servers. According to various embodiments, all or some of the operations to be executed by the electronic device 11 may be executed by another electronic device or a plurality of other electronic devices (e.g., the external electronic devices 12 and 13 or the server 14). According to one embodiment, in the case where the electronic device 11 should perform a certain function or service automatically or by a request, the electronic device 11 may request some functions or services that are associated therewith from the other electronic devices (e.g., the external electronic devices 12 and 13 or the server 14), instead of, or in addition to, executing the functions or service by itself. The other electronic devices (e.g., the external electronic devices 12 and 13 or the server 14) may execute the requested functions or additional functions, and may deliver the results to the electronic device 11. The electronic device 11 may provide the requested functions or services by processing the received results as they are or additionally. For this purpose, for example, a cloud computing technique, a distributed computing technique, or a client-server computing technique may be used.

Figure 19:
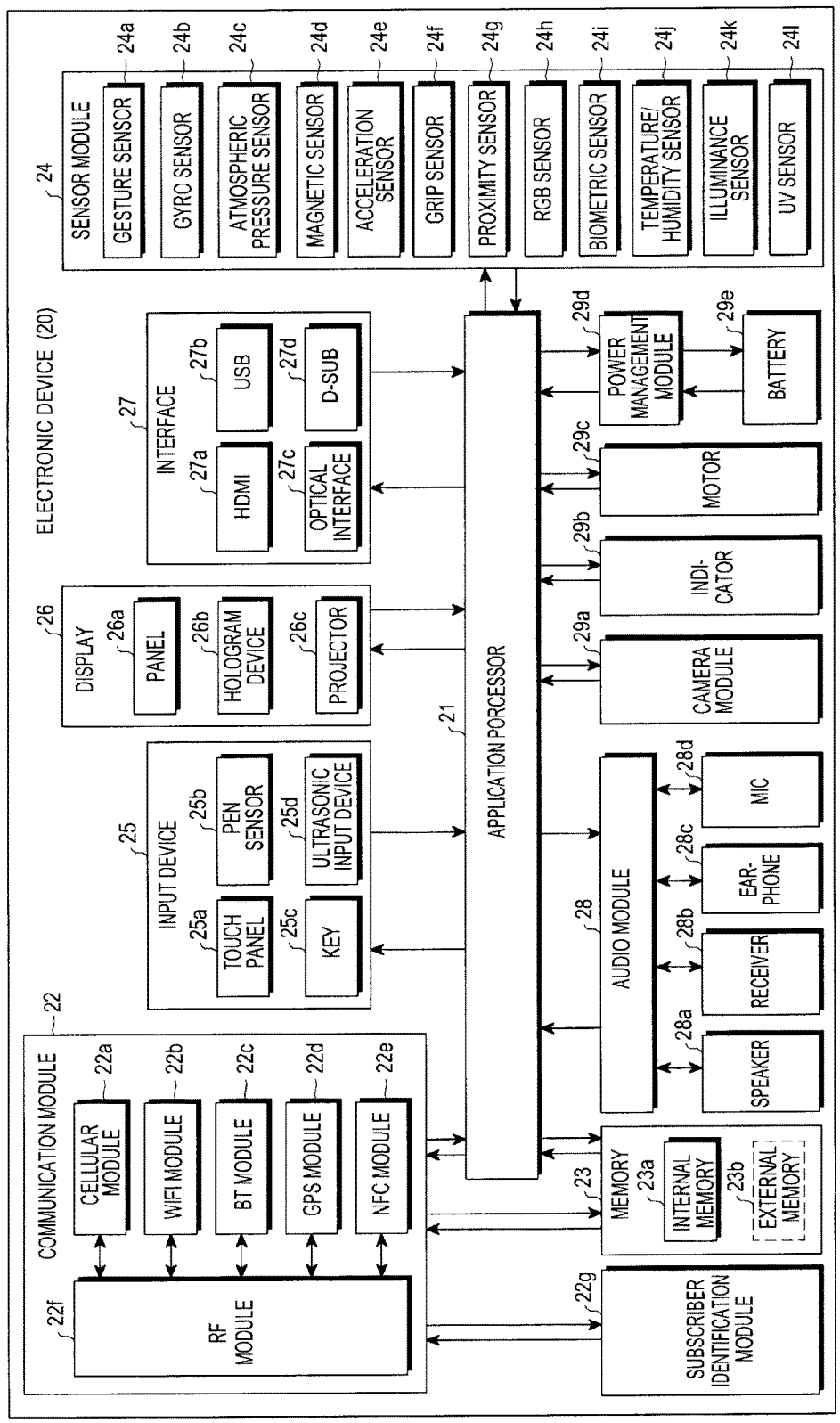
FIG. 19 is a block diagram illustrating an electronic device including a lens assembly according to various embodiments of the present disclosure.

FIG. 19 is a block diagram illustrating an electronic device 20 according to various embodiments of the present disclosure.

Referring to FIG. 19, the electronic device 20 may include, for example, the entirety or a portion of the electronic device 500 or 11 illustrated in FIG. 17 and/or FIG. 18. The electronic device 20 may include at least one processor (e.g., Application Processor (AP)) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and a motor 29c.

The processor 21 may drive, for example, an operating system or an application program so as to control a plurality of hardware or software components connected thereto, and may also perform various data processing and arithmetic operations. The processor 21 may be implemented by, for example, a System-on-Chip (SoC). According to one embodiment, the processor 21 may further include a Graphic Processing Unit (GPU) and/or an image signal processor. The processor 21 may include at least some components (e.g., the cellular module 22a) among the components illustrated in FIG. 19. The processor 21 may load a command or data received from at least one of the other components (e.g., a non-volatile memory) in a volatile memory to process the command and data, and may store various data in a non-volatile memory. The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 22 may have a configuration that is the same as, or similar to, the communication interface 11g of FIG. 18. The communication module 22 may include, for example, a cellular module 22a, a WiFi module 22b, a Bluetooth module 22c, a GNSS module 22d (e.g., a GPS module, a Glonass module, a Beidou module, or a Galileo module), an NFC module 22e, and a Radio Frequency (RF) module 22f.

The cellular module 22a may provide, for example, a voice call, a video call, a message service, or an internet service through, for example, a communication network. According to one embodiment, the cellular module 22a may perform discrimination and authentication of the electronic device 20 within the communication network by using the subscriber identification module (e.g., a SIM card) 22g. According to one embodiment, the cellular module 22a may perform at least some of the functions that may be provided by the processor 21. According to one embodiment, the cellular module 22a may include a Communication Processor (CP).

Each of the WiFi module 22b, the Bluetooth module 22c, the GNSS module 22d, and the NFC module 22e may include, for example, a processor to process data transmitted/received through a corresponding module. According to a certain embodiment, at least some (e.g., two or more) of the cellular module 22a, the WiFi module 22b, the Bluetooth module 22c, the GNSS module 22d, and the NFC module 22e may be incorporated in a single Integrated Chip (IC) or an IC package.

The RF module 22f may transmit/receive, for example, a communication signal (e.g., an RF signal). The RF module 22f may include, for example, a transceiver, a Power Amp Module (PAM), a frequency filter, a Low Noise Amplifier (LNA), or an antenna. According to another embodiment, at least one of the cellular module 22a, the WiFi module 22b, the Bluetooth module 22c, the GNSS module 22d, and the NFC module 22e may transmit/receive an RF signal through one or more separate RF modules.

The subscriber identification module 22g may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 23 (e.g., memory 11c) may include, for example, an internal memory 23a or an external memory 23b. The internal memory 23a may include at least one of, for example, a volatile memory (e.g., a Dynamic RAM (DRAM), a Static RAM (SRAM), or a Synchronous DRAM (SDRAM)), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard drive, or a Solid State Drive (SSD)).

The external memory 23b may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 23b may be functionally and/or physically connected to the electronic device 20 through various interfaces.

For example, the sensor module 24 may measure a physical quantity or may sense an operating status of the electronic device 20, and may then convert the measured or sensed information into electric signals. The sensor module 24 may include at least one of, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., RGB (Red, Green, Blue) sensor), a biometric sensor 24i, a temperature/humidity sensor 24j, an illuminance sensor 24k, and a Ultra-Violet (UV) sensor 24l. Additionally or alternatively, the sensor module 24 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 24 may further include a control circuit for controlling one or more sensors incorporated therein. In a certain embodiment, the electronic device 20 may further include a processor configured to control the sensor module 24 as a part of the processor 21 or separate from the processor 21 so as to control the sensor module 24 while the processor 21 is in the sleep state.

The input device 25 may include, for example, a touch panel 25a, a (digital) pen sensor 25b, a key 25c, or an ultrasonic input device 25d. As the touch panel 25a, at least one of, for example, a capacitive type touch panel, a resistive type touch panel, an infrared type touch panel, and an ultrasonic type panel may be used. In addition, the touch panel 25a may further include a control circuit. The touch panel 25a may further include a tactile layer so as to provide a tactile reaction to a user.

The (digital) pen sensor 25b may be, for example, a portion of the touch panel or may include a separate recognition sheet. The key 25c may include, for example, a physical button, an optical key, or a keypad. The ultrasonic input device 25d may sense, through a microphone (e.g., a microphone 28d), ultrasonic waves that are generated by an input tool so as to confirm data corresponding to the sensed ultrasonic waves.

The display 26 (e.g., the display 11f) may include a panel 26a, a hologram device 26b, or a projector 26c. The panel 26a may include a configuration that is the same as, or similar to, that of the display 521 or 11f of FIG. 17 and/or FIG. 18. The panel 26a may be implemented to be flexible, transparent, or wearable. The panel 26a may be configured as a single module with the touch panel 25a. The hologram device 26b may show a stereoscopic image in the air using interference of light. The projector 26c may project light onto a screen so as to display an image. The screen may be located, for example, inside or outside the electronic device 20. According to one embodiment, the display 26 may further include a control circuit to control the panel 26a, the hologram device 26b, or the projector 26c.

The interface 27 may include, for example, a High-Definition Multimedia Interface (HDMI) 27a, a Universal Serial Bus (USB) 27b, an optical interface 27c, or a D-subminiature (D-sub) 27d. For example, the interface 27 may be included in the communication interface 11g illustrated in FIG. 18. Additionally or alternatively, the interface 27 may include, for example, a Mobile High-definition Link (MHL) interface, a Secure Digital (SD) card/Multi-Media Card (MMC) interface, or an Infrared Data Association (IrDA) standard interface.

The audio module 28 may bi-directionally convert, for example, sound and electric signals. At least some of the components of the audio module 28 may be included in, for example, the input/output interface 11e illustrated in FIG. 18. The audio module 28 may process sound information input or output through, for example, a speaker 28a, a receiver 28b, an earphone 28c, or a microphone 28d.

The camera module 29a is a device that is capable of photographing, for example, a still image and a moving image. According to one embodiment, the camera module 29a may include one or more image sensors (e.g., a front sensor or a rear sensor), a lens, an Image Signal Processor (ISP), or a flash (e.g., LED or xenon lamp). The camera module 29a may include at least one of the above-described lens assemblies 100, 200, 300, and 400.

The power management module 29d may manage, for example, the electric power of the electronic device 20. According to one embodiment, the power management module 29d may include a Power Management Integrated Circuit (PMIC), a charger Integrated Circuit (IC), or a battery or fuel gauge. The PMIC may be configured as a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 29e, and a voltage, a current, or a temperature during the charge. The battery 29e may include, for example, a rechargeable battery and/or a solar battery.

The indicator 29b may indicate a specific status of the electronic device 20 or of a part thereof (e.g., the processor 21), such as a booting status, a message status, or a charged status. The motor 29c may convert an electric signal into a mechanical vibration, and may generate, for example, a vibration or a haptic effect. Although not illustrated, the electronic device 20 may include a processing device (e.g., a GPU) to support a mobile TV. The processing device to support a mobile TV may process media data according to the standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit," "logic," "logical block," "component," or "circuit." The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 11b), may cause the one or more processors to execute the function corresponding to the instruction. The computer-readable storage medium may be, for example, the memory 11c.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A lens assembly comprising:
a first lens having positive refractive power and disposed along an optical axis and to face an object;
a second lens having negative refractive power and disposed along the optical axis and adjacent to the first lens;
a third lens having positive refractive power and disposed along the optical axis and adjacent to the second lens; and
a fourth lens having a negative refractive power and disposed along the optical axis and adjacent to the third lens, having a first concave face that faces an imaging surface of an image sensor, and having a second convex face that faces the object, wherein the second convex face is convex at a location where the second convex face intersects the optical axis,
wherein characteristics of the lens assembly satisfy equations $$CT2/OAL<0.06$$

and $$EPD/f<2.0$$

wherein "CT2" represents a thickness of the second lens on the optical axis, "OAL" represents a length of the lens assembly, "EPD" represents an Entrance Pupil Diameter of an incident pupil of the lens assembly, and "f" represents a focal distance of the lens assembly.

2. The lens assembly of claim 1, wherein
the characteristics of the lens assembly further satisfy equation $$38.0°<\text{half-field angle}<47.0°,$$

wherein "half-field angle" is a half-field angle of the lens assembly.

3. The lens assembly of claim 1, wherein a face of the first lens facing the object is convex.

4. The lens assembly of claim 1, wherein an air gap between the first lens and the second lens is 0.1 mm or less.

5. The lens assembly of claim 1, wherein the first lens, the second lens, the third lens, and/or the fourth lens is made of plastic.

6. The lens assembly of claim 1, wherein the characteristics of the lens assembly further satisfy equation $$-2<f4/f<-0.3$$

wherein "f4" represents a focal distance of the fourth lens, and "f" represents the focal distance of the lens assembly.

7. The lens assembly of claim 1, wherein the characteristics of the lens assembly further satisfy equation $$0.5 < f3/f < 1.5$$

wherein "f3" represents a focal distance of the third lens, and "f" represents the focal distance of the lens assembly.

8. The lens assembly of claim 1, wherein a curvature radius of the second convex face of the fourth lens greater than 7.5.

9. An electronic device comprising:
a lens assembly; and
an image sensor that detects an image of an object that passes through the lens assembly,
wherein the lens assembly includes:
   a first lens having positive refractive power and disposed along an optical axis and to face the object;
   a second lens having negative refractive power and disposed along the optical axis and adjacent to the first lens;
   a third lens having positive refractive power and disposed along the optical axis and adjacent to the second lens; and
   a fourth lens having a negative refractive power and disposed along the optical axis and adjacent to the third lens, having a first concave face that faces an imaging surface of the image sensor, and having a second convex face that faces the object, wherein the second convex face is convex at a location where the second convex face intersects the optical axis, and
wherein characteristics of the lens assembly satisfy equations $$CT2/OAL < 0.06$$

and $$EPD/f < 2.0$$

wherein "CT2" represents a thickness of the second lens on the optical axis, "OAL" represents a length of the lens assembly, "EPD" represents an Entrance Pupil Diameter of an incident pupil of the lens assembly, and "f" represents a focal distance of the lens assembly.

10. The electronic device of claim 9, further comprising:
a housing mounted with the lens assembly on one face of the electronic device, the housing includes a detachable cover member on the one face of the electronic device; and
an opening formed in the detachable cover member to provide a photographing path of the lens assembly.

11. The electronic device of claim 9, wherein the characteristics of the lens assembly further satisfy equation $$38.0° < \text{half-field angle} < 47.0°,$$

wherein "half-field angle" is a half-field angle of the lens assembly.

12. The electronic device of claim 9, wherein a face of the first lens facing the object is convex.

13. The electronic device of claim 9, wherein an air gap between the first lens and the second lens is 0.1 mm or less.

14. The electronic device of claim 9, wherein the first lens, the second lens, the third lens, and/or the fourth lens is made of plastic.

15. The electronic device of claim 9, wherein the characteristics of the lens assembly further satisfy equation $$-2 < f4/f < -0.3$$

wherein "f4" represents a focal distance of the fourth lens, and "f" represents the focal distance of the lens assembly.

16. The electronic device of claim 9, wherein the characteristics of the lens assembly further satisfy equation $$0.5 < f3/f < 1.5$$

wherein "f3" represents a focal distance of the third lens, and "f" represents the focal distance of the lens assembly.

17. The electronic device of claim 9, wherein a curvature radius of the second convex face of the fourth lens is greater than 7.5.

* * * * *